Oct. 20, 1931.        P. E. MATTHEWS        1,828,425
STABILIZING DEVICE FOR STEERING KNUCKLES
Filed Dec. 19, 1929
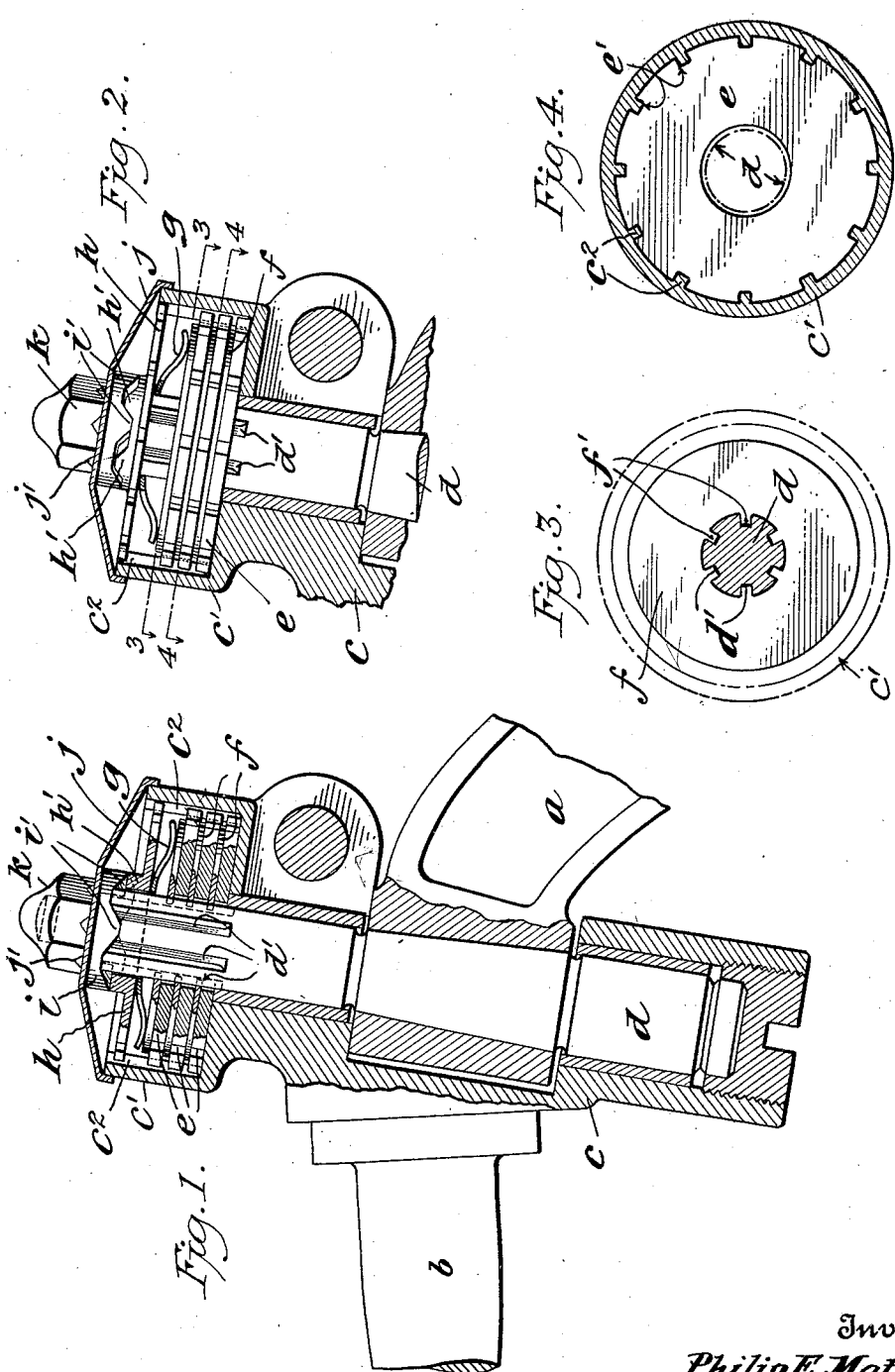
Inventor:
Philip E. Matthews
By his Attorneys
Redding, Greeley, O'Shea & Campbell Patented Oct. 20, 1931

1,828,425

UNITED STATES PATENT OFFICE

PHILIP E. MATTHEWS, OF PLAINFIELD, NEW JERSEY, ASSIGNOR TO INTERNATIONAL MOTOR COMPANY, OF NEW YORK, N. Y., A CORPORATION OF DELAWARE

STABILIZING DEVICE FOR STEERING KNUCKLES

Application filed December 19, 1929. Serial No. 415,232.

The present invention relates to steering mechanisms and embodies, more specifically, an improved steering mechanism which is so constructed that the steering of the vehicle is greatly facilitated, at the same time stabilizing the mechanism and preventing the objectionable effects of shimmying of the front wheels as frequently is the case when the bushings of steering mechanisms become worn. It is now well recognized that the force required to steer a vehicle can be materially reduced by mounting the steering knuckles through anti-friction bearings. Such mounting, however, has the disadvantage of increasing front wheel shimmy since such shimmy is influenced and, in a degree, controlled by the friction in the steering mechanism. When the car is new and its bearings and joints close fitting, shimmy is not noticeable, but as soon as wear takes place, there is a marked tendency toward such condition in the front wheels. As a remedy for this condition, it has been suggested to increase the friction of the steering linkage. In existing designs, the devices for increasing the friction in the steering linkage have been found to be objectionable and ineffective to reduce, sufficiently, the front wheel shimmy. The reason for the above is that the damping friction is not applied to the mechanism sufficiently close to the region where the shimmy originates. Usually the friction device is either connected to the cross steering tube or drag link, such location rendering the device ineffective to prevent shimmy by reason of freedom of movement or play in the steering knuckle or cross steering tube joints.

As a further consideration, it is important that the damping friction should be effective only when the wheels are in a straight-ahead position, since there is no tendency to shimmy during turning of the wheels and since the turning of the wheels should preferably require a minimum effort.

An object of the invention, accordingly, is to provide a device for preventing shimmy where the tendency for such action originates.

A further object of the invention is to provide a device for effectively eliminating the shimmy in steering mechanisms which can be applied to existing forms of mechanisms without changing the design thereof.

A further object of the invention is to provide a device which preserves the easy steering qualities of a steering machanism embodying anti-friction bearings at the same time, preventing shimmy therein.

A further object of the invention is to provide a device of the above character which prevents shimmy when the wheels are in a straight ahead position, at the same time enabling the wheels to be turned readily in either direction.

Further objects, not specifically enumerated above, will be apparent as the invention is described in greater detail in connection with the accompanying drawings, wherein:

Figure 1 is a view in front elevation, partly broken away and in section, showing a steering knuckle constructed in accordance with the present invention.

Figure 2 is a segmental view, similar to Figure 1, showing the steering knuckle after having been turned from the position shown in Figure 1.

Figure 3 is a view in section, taken on line 3—3 of Figure 2, and looking in the directon of the arrows.

Figure 4 is a view in section, taken on line 4—4 of Figure 2, and looking in the direction of the arrows.

Referring to the above drawings, $a$ indicates the front axle of a motor vehicle carrying a wheel spindle $b$ which is mounted upon a knuckle $c$. A knuckle pin $d$ mounts the knuckle upon the axle $a$ and is formed with a plurality of splines $d'$ at the upper end thereof.

The knuckle $c$ is formed with a housing $c'$ within which a plurality of radial notches $c^2$ extend. Discs $e$ are formed with peripheral slots $e'$ to engage the tongue $c^2$ and thus cause the discs to be moved with the steering knuckle $c$. Centrally of the discs, apertures therein are formed to receive the upper portion of the knuckle pin $d$ and permit relative movement therebetween.

Plates $f$ are formed with inwardly extending tongues $f'$ to engage the splines $d'$ and cause the plates $f$ to be moved with the knuckle pin $d$. A flat spring $g$ mounts the plates and discs under a degree of compression and is seated against the upper plate $h$ which engages the tongues $c^2$ of the housing $c'$ and is turned therewith. Axial cams $h'$ are formed on the disc $h$ and are engaged by similarly formed cams $i'$ which are formed upon a collar $i$ splined upon knuckle pin $d$.

A closure $j$ is provided for the housing and mounted over the collar $i$, a nut $k$ being threaded over the protruding end of the knuckle pin $d$ to place the spring $g$ under a desired degree of compression and maintain the cams $h'$ and $i'$ in engagement. In order to facilitate such adjustment projections $j'$ are formed on the housing $j$ to engage cooperating recesses in the nut $k'$. In this manner the amount of friction between the plates is readily adjusted and the friction in both knuckles easily equalized. The spring pressure can easily be determined by counting the number of clicks of the adjusting nut and the proper adjustment of the mechanism is thus readily maintained.

From the foregoing, it will be seen that a desired degree of friction, sufficient to prevent shimmying of the front wheels may be maintained between the knuckle pins and steering knuckles when the vehicle is moving in a straight ahead direction. Upon turning of the wheels, the foregoing friction is immediately reduced, if not substantially eliminated and the steering thus materially facilitated. The damping friction is applied at the correct points, that is, where it will be most effective to reduce and eliminate front wheel shimmy and the steering mechanism may embody anti-friction bearings.

While the invention has been described with specific reference to the accompanying drawings, it is not to be limited, save as defined in the appended claims.

I claim as my invention:

1. A device of the character described comprising relatively movable steering elements, a housing formed on one of the elements, discs carried by the housing, the other element being co-axial to the housing and discs, co-operating discs carried by the second element and spaced between the first discs, means to urge the discs together, a plate carried by the first element and serving as a seat for the means to urge the discs together, a plurality of cams disposed annularly, a plurality of cooperating cams annularly disposed and normally engaging the first cams, a cover for the housing, and adjustable means on the cover for maintaining the discs under compression through the cams.

2. A device of the character described comprising relatively movable steering elements, a housing formed on one of the elements, discs carried by the housing, the other element being co-axial to the housing and discs, cooperating discs carried by the second element and spaced between the first discs, means to urge the discs together, a plate carried by the first element and serving as a seat for the means to urge the discs together, a plurality of cams disposed annularly, a plurality of cooperating cams annularly disposed and normally engaging the first cams, a cover for the housing, and means to secure the cover in position and maintain the discs under compression.

3. A device of the character described comprising relatively movable steering elements, a housing formed on one of the elements, discs carried by the housing, the other element being co-axial to the housing and discs, cooperating discs carried by the second element and spaced between the first discs, means to urge the discs together, a plate carried by the first element and serving as a seat for the means to urge the discs together, a plurality of cams disposed annularly, and a plurality of cooperating cams annularly disposed and normally engaging the first cams.

4. A device of the character described comprising relatively movable steering elements, a housing formed on one of the elements, discs carried by the housing, the other element being co-axial to the housing and discs, cooperating discs carried by the second element and spaced between the first discs, means to urge the discs together, a plate carried by the first element and serving as a seat for the means to urge the discs together, an annular cam carried on the plate, and a cooperating annular cam on the second element normally engaging the first cam.

5. A device of the character described comprising relatively movable steering elements, a housing formed on one of the elements, discs carried by the housing, the other element being co-axial to the housing and discs, cooperating discs carried by the second element and spaced between the first discs, means to urge the discs together, a plate carried by the first element and serving as a seat for the means to urge the discs together, a cam carried on the plate, a cooperating cam carried by the second element and normally engaging the first cam when the elements are in a normal position, and means to adjust the pressure exerted on the plates by the urging means.

6. A device of the character described comprising relatively movable steering elements, a housing formed on one of the elements, discs carried by the housing, the other element being co-axial to the housing and discs, cooperating discs carried by the second element and spaced between the first discs, means to urge the discs together, a plate carried by the first element and serving as a seat for the means to urge the discs together, a cam carried on the plate, and a cooperating cam carried by the second element and normally engaging the first cam when the elements are in a normal position.

7. A device of the character described comprising relatively movable steering elements between which steering forces are transmitted, cooperating friction members carried by the respective elements, a plate carried by one of the elements and formed with an annular cam, a spring seated against the plate and maintaining the members under pressure, and cooperating annular cam carried by the other element to engage the first cam.

This specification signed this 16th day of Dec., A. D. 1929.

PHILIP E. MATTHEWS.